United States Patent Office
3,705,854
Patented Dec. 12, 1972

1

3,705,854
DEICER COMPOSITION
Paul E. Gunning, Kenmore, N.Y., assignor to Osmose
   Wood Preserving Co. of America Inc., Buffalo, N.Y.
No Drawing. Filed Feb. 12, 1970, Ser. No. 11,002
               Int. Cl. C09k 3/18
U.S. Cl. 252—70                                  4 Claims

ABSTRACT OF THE DISCLOSURE

A deicer composition consisting essentially of 5 to 50 weight percent of a mixed ether of the type having only one free hydroxyl group, preferably propylene glycol methyl ether, 25 to 95 weight percent water soluble alcohol, and the remainder water. Ethylene glycol methyl ether and ethylene glycol ethyl ether each can be substituted for propylene glycol methyl ether in the same weight percent. The water soluble alcohol preferably is normal propyl or isopropyl alcohol. The deicer composition can be packaged in an aerosol spray container, in which case a suitable gaseous propellant, such as carbon dioxide or nitrous oxide, is added.

BACKGROUND OF THE INVENTION

This invention relates to a novel chemical composition and, more particularly, to a composition for melting ice on and defrosting a surface such as a windshield of a vehicle.

Windshield deicer fluids are commercially available and commonly are packaged in aerosol spray cans. The formulations have included methyl, ethyl or propyl alcohols either alone or in combination with other ingredients including water and ethylene glycol. For example, U.S. Patent 3,096,290 describes a windshield deicer fluid containing 25–95 weight percent normal propanol, 5–50 weight percent ethylene glycol and 0–25 weight percent water.

None of the deicer compositions heretofore available has proven to be completely free from various disadvantages when used. For example, compositions including the above-mentioned alcohols alone are dangerously flammable and yield a product which has serious refreezing problems associated with use under certain weather conditions. In addition, such alcohols tend to attack any painted surface adjacent the surface being deiced, and this attack is particularly severe and undesirable for automobile paint finishes.

It has been found that when the composition contains normal propyl alcohol, the flash point is raised thereby reducing the danger of flammability. The problems of refreezing have been shown to be diminished when the deicer composition includes water and ethylene glycol in suitable quantities. Ethylene glycol, however, unfortunately causes other problems some of which are associated with its evaporation rate and vapor pressure. In particular, when a product consisting of an alcohol, water, and ethylene glycol is sprayed onto a frosted automobile windshield during freezing weather, the frost dissolves and can be wiped away by the windshield wipers, and the alcohol and water evaporate from the applied product leaving the ethylene glycol behind. This material evaporates very slowly leaving the windshield smeared or coated with a

2 grease-like substance, especially when the windshield wipers spread the glycol. Moreover, the areas of the windshield not in the path of the wipers become coated with a layer of glycol which picks up dirt and road film. Both the smearing and the dirt pick-up give the undesirable result of limiting the driver's range of vision.

Another problem with deicer compositions heretofore available is that the combination of ethylene glycol, water and isopropyl alcohol has a viscosity high enough at low temperatures, such as at 0 degrees Fahrenheit, to significantly weaken the spray pattern of an aerosol product.

SUMMARY OF THE INVENTION

It is, therefore, an object of this invention to provide a deicing composition having superior deicing properties yet which is truly non-smearing and does not cause a buildup of material on the surface being treated which buildup otherwise can collect dirt.

It is a further object of this invention to provide such a deicing composition which does not experience a viscosity increase at low temperature.

It is a further object of this invention to provide such a deicing composition which has a high flash point and is non-deleterious to automobile finishes.

Briefly state, I have discovered that the foregoing objects can be accomplished, and prior art disadvantages overcome, by a deicer composition which comprises a mixed ether of the type having only one free hydroxyl group, water soluble alcohol and preferably also water. The preferred composition consists essentially of 5 to 50 weight percent propylene glycol methyl ether, 25 to 95 weight percent normal propyl or isopropyl alcohol and the remainder water. Other ethers which can be employed are ethylene glycol methyl ether and ethylene glycol ethyl ether. The deicer composition can be packaged in an aerosol spray container which would include a suitable gaseous propellant.

The foregoing and additional advantages and characterizing features of the present invention will become clearly apparent upon a reading of the ensuing detailed description of an illustrative embodiment thereof.

DETAILED DESCRIPTION OF AN ILLUSTRATIVE EMBODIMENT

The deicer composition of the present invention comprises a mixed ether of the type having only one free hydroxyl group, water soluble alcohol and preferably also water. A preferred ether is propylene glycol methyl ether, the formation of which can be represented by the relationship:

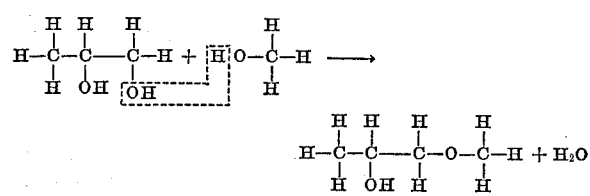

Another ether in this series which can be employed in the deicer composition is ethylene glycol methyl ether, the formation of which can be represented as follows:

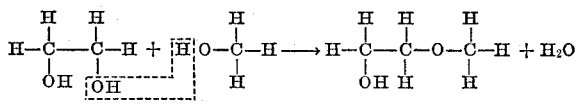

A third ether in this series which can be employed is ethylene glycol ethyl ether, the formation of which can be represented by the relationship:

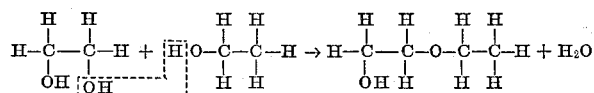

A characteristic or property common to the ethers in this series or group is the presence of only one free hydroxyl group, the significance of which will be explained in detail hereafter. Propylene glycol methyl ether is marketed under the trade name of Dowanol PM, ethylene glycol methyl ether under the trade name Dowanol EM, and ethylene glycol ethyl ether under the trade name Dowanol EE. A preferred water soluble alcohol for the deicer composition of the present invention is normal propyl alcohol or isopropyl alcohol, although other water soluble alcohols can be substituted.

In carrying out my invention, the deicer composition preferably consists essentially of 5 to 50 weight percent propylene glycol methyl ether, 25 to 95 weight percent normal propyl or isopropyl alcohol and less than 25 weight percent water. Ethylene glycol methyl ether or ethylene glycol ethyl ether each can be substituted for propylene glycol methyl ether in the same weight percentage. The deicer composition of my invention can be packaged in an aerosol spray container, in which case a suitable gaseous propellant such as carbon dioxide or nitrous oxide is added to the deicer composition. The relative amount of propellant would be, for example, about 2 parts by weight gaseous propellant for every 100 parts by weight of the deicer composition.

The ether constituent, such as propylene glycol methyl ether, of the deicer composition of my invention contributes chiefly to the melting of frost and ice. It is made quick acting by the penetrating action of the water soluble alcohol. Isopropyl alcohol has a lower flash point, i.e. temperature at which combustion occurs, than does normal propyl alcohol. The latter must be employed in the deicer composition, therefore, when certain specifications as to flash point must be met.

The use of an ether of the type having only one free hydroxyl group, rather than ethylene glycol, provides a significantly improved deicer composition relative to compositions heretofore available. The prior art combination of ethylene glycol, water and isopropyl alcohol has a viscosity which is high enough at low temperatures to significantly weaken the spray pattern of an aerosol product. In this prior art combination the viscosity must be a result of molecular interaction between alcohol molecules alone, or between alcohol and ethylene glycol molecules. The latter would appear to be the case because I have found that when propylene glycol methyl ether is used with isopropyl alcohol in a deicer composition, no such viscosity effect is noted. In particular, this ether combination was found to have a viscosity within the maximum limits of 29 centistokes at 0 degrees Fahrenheit, 11 centistokes at 32 degrees F., and 5 centistokes at 70 degrees F.

The chemical interaction between ethylene glycol and isopropyl alcohol is thought to be a form of hydrogen bonding which could result in polymeric complexes of substantial chain length. This is because ethylene glycol contains two hydroxyl groups both of which can interact with isopropyl alcohol molecules. The resulting polymeric complexes would explain the relatively higher viscosity and lower evaporation rate of certain prior art deicer compositions which include ethylene glycol. The higher viscosity impairs the spray pattern of an aerosol product. Relatively slow evaporation results in smearing as well as a coating on the surface being treated which can pick up dirt.

Since propylene glycol methyl ether has only one free hydroxyl group, hydrogen bonding would be expected, at the most, with only one isopropyl alcohol molecule. As a result, there can be no formation of polymeric complexes by the deicer composition of my invention. The same result occurs when ethylene glycol methyl ether and ethylene glycol ethyl ether each are substituted in the deicer composition. This means that a deicer composition containing propylene glycol methyl ether, or one of the other two ethers substituted therefor, water and isopropyl alcohol exhibits better viscosity properties than such a product containing ethylene glycol, and thus will have a better spray pattern at low temperatures, such as 0 degrees Fahrenheit.

The inclusion of water in the deicer composition of the present invention can serve as a heat source from which the deicer draws heat instead of relying solely upon the surface being treated for heat which otherwise might be cooled enough to refreeze the melted ice. The high specific heat of water allows it to give up relatively large quantities of heat with a relatively small decrease in temperature.

The advantageous and desirable results provided by the deicer composition of the present invention are illustrated further by way of a few specific examples. Experimental products containing, by weight, 30 percent propylene glycol methyl ether, 55 percent isopropyl alcohol or normal propyl alcohol and 15 percent water were used to deice the windshield of an automobile during freezing weather. The products were used five times each and compared each time with a product containing ethylene glycol. The formulations containing propylene glycol methyl ether dissolved frost, did not smear, and left no residues on the windshield after a few minutes of driving. The product containing ethylene glycol dissolved frost, but caused smearing and left a film on the windshield, which remained for from several hours to one day. The film of the product containing ethylene glycol collected road dirt and obscured the vision of the driver through parts of the windshield.

The deicer composition of the persent invention desirably is not harmful to automobile paint finishes. Drops of deicer fluid were allowed to stand undisturbed overnight for 16 hours on typical automotive finish paint panels at 40 degrees Fahrenheit. Very slight spotting occurred with deicer formulations containing proplyene glycol methyl ether on some paints. In actual use, the deicer composition is not allowed to "set" on the painted finish for more than a few minutes, since the composition is used just before starting an automobile and is evaporated quickly while the automobile is in motion.

It is therefore apparent that the present invention accomplishes its intended objects. The deicer composition in addition to having superior deicing properties is truly non-smearing and does not cause a buildup of material on the surface being treated which buildup otherwise can collect dirt. Complete evaporation of all of the components of the composition results, and there is no deleterious viscosity increase at low temperatures because the formation of polymeric complexes is prevented. The composition has a relatively high flash point and is not harmful to automobile paint finishes.

While a single specific embodiment of the present invention has been described in detail, this is done for the purpose of illustration without thought of limitation.

I claim:

1. A deicer composition consisting of 5 to 50 weight percent propylene glycol methyl ether, 25 to 95 weight percent water soluble alcohol, and the remainder water.

2. The deicer composition defined in claim 1 wherein said water soluble alcohol comprises normal propyl alcohol.

3. The deicer composition defined in claim 1 wherein said water soluble alcohol comprises isopropyl alcohol.

4. The deicer composition defined in claim 1 wherein the water content does not exceed 25 percent.

References Cited

UNITED STATES PATENTS

| | | | |
|---|---|---|---|
| 3,096,290 | 7/1963 | Duane et al. | 252—70 |
| 3,245,912 | 4/1966 | White | 252—70 |
| 3,309,321 | 3/1967 | McMaster | 252—152 |
| 3,441,510 | 4/1969 | Campbell | 252—170 X |
| 3,537,900 | 11/1970 | Halbert | 252—70 X |

OTHER REFERENCES

"Modern Glass Cleaners," Soap & Sanitary Chemicals by Milton A. Lesser (September 1952), pp. 46 and 48.

Hackh's "Chemical Dictionary" 3rd ed. (1944), p. 166.

LEON D. ROSDOL, Primary Examiner

H. A. PITLICK, Assistant Examiner